United States Patent [19]

Cumming et al.

[11] Patent Number: 5,414,069

[45] Date of Patent: May 9, 1995

[54] ELECTROLUMINESCENT POLYMERS, PROCESSES FOR THEIR USE, AND ELECTROLUMINESCENT DEVICES CONTAINING THESE POLYMERS

[75] Inventors: William J. Cumming, Chelmsford, Mass.; Russell A. Gaudiana, Merrimack, N.H.; Richard T. Ingwall, Newton, Mass.; Eric S. Kolb, Ipswich, Mass.; Parag G. Mehta, Woburn, Mass.; Richard A. Minns, Arlington, Mass.

[73] Assignee: Polaroid Corporation, Cambridge, Mass.

[21] Appl. No.: 12,038

[22] Filed: Feb. 1, 1993

[51] Int. Cl.$^6$ .................. C08G 69/08; C08G 63/00; C08G 77/04

[52] U.S. Cl. .................. 528/310; 528/10; 528/30; 528/37; 528/59; 528/125; 528/128; 528/170; 528/171; 528/172; 528/173; 528/192; 528/220; 528/229; 528/353

[58] Field of Search ........... 528/30, 10, 37, 59, 528/310, 125, 128, 170, 171–173, 220, 229, 192, 353

[56] References Cited

U.S. PATENT DOCUMENTS

| | | | |
|---|---|---|---|
| 3,415,777 | 10/1968 | Bostick | 528/30 |
| 3,621,321 | 11/1971 | Williams et al. | 313/108 A |
| 3,899,328 | 8/1975 | Limburg | 430/70 |
| 3,957,725 | 5/1976 | Limburg | 528/30 |
| 4,356,429 | 11/1982 | Tang | 313/503 |
| 5,059,512 | 10/1991 | Babich et al. | 430/280 |
| 5,231,329 | 7/1993 | Nishikitani et al. | 313/503 |

FOREIGN PATENT DOCUMENTS

| | | |
|---|---|---|
| 4-359989 | 12/1992 | Japan . |
| WO90/13148 | 11/1990 | WIPO . |
| WO92/03490 | 3/1992 | WIPO . |
| WO92/03491 | 3/1992 | WIPO . |

OTHER PUBLICATIONS

CA86: 56154w, Mar. 7, 1977, Levchenko et al.
CA100: 176206u, May 28, 1984, Luzina et al.
CA70: 38674f, Mar. 10, 1969, Bostick.
Friend, R. H. et al., J. Phys. D: Appl. Phys. 20, 1367–1384 (Jul. 1987).
Johnson, G. E., J. Chem. Phys., 62, 4697–5709 (Feb. 1975).
Partridge, R. H., Polymer, 24, 733–762 (Jun. 1983).

*Primary Examiner*—John Kight, II
*Assistant Examiner*—P. Hampton-Hightower
*Attorney, Agent, or Firm*—David J. Cole

[57] ABSTRACT

An electroluminescent polymer comprises a main chain and a plurality of side chains, each of the side chains comprising an electroluminescent group and a flexible spacer connecting the electroluminescent group to the main chain, the spacers and the main chain being such that the electroluminescent groups are not conjugated with one another. The nature of the main chain and the spacer groups can be varied to enhance solubility, film-forming ability and other characteristics of the polymer, without significantly changing the electroluminescent properties of the polymer.

12 Claims, 1 Drawing Sheet

ELECTROLUMINESCENT POLYMERS, PROCESSES FOR THEIR USE, AND ELECTROLUMINESCENT DEVICES CONTAINING THESE POLYMERS

BACKGROUND OF THE INVENTION

This invention relates to electroluminescent polymers, electroluminescent devices containing these polymers, processes for generating electromagnetic radiation using these polymers, and processes for the preparation of these polymers.

In recent years, a great deal of research has been conducted into electroluminescent materials, that is to say materials which emit electromagnetic radiation (typically visible light) when an electric current flows through the polymer. Electroluminescent materials are potentially useful for the construction of image display devices, which could be very thin and lightweight, and could thus advantageously replace cathode ray tubes, gas plasma displays, liquid crystal displays and other types of image display devices.

Several different types of electroluminescent materials are known; see, generally as to development of such materials, International Patent Application No. PCT/GB90/00584 (Publication No. WO 90/13 148). The first type to be developed was inorganic semiconductor materials such as gallium phosphide and zinc sulfide. However, such inorganic electroluminescent materials are not readily usable in large image display devices, and many of them suffer from practical drawbacks, including poor reliability. Accordingly, most recent research has concentrated on organic electroluminescent materials.

Many organic compounds, especially polycyclic arenes such as anthracene, perylene, pyrene and coronene, are electroluminescent. However, electroluminescent devices using these monomeric organic compounds suffer from poor reliability, and also present difficulties in preparing the thin layers of the materials needed for use in practical electroluminescent image display devices, and the electrodes needed for electrical contact with such layers. Techniques such as sublimation of the organic material produce layers which are soft, prone to recrystallization and unable to support high temperature deposition of electrode layers, while techniques such as Langmuir-Blodgett film deposition produce films of poor quality, dilution of the active material and high cost of fabrication. Prior art electroluminescent devices formed from these materials, such as that described in U.S. Pat. No. 3,621,321, typically suffer from high power consumption and low light output.

Attempts have also been made to use solid solutions of monomeric organic electroluminescent materials in non-electroluminescent polymers as the active layer in electroluminescent devices; see, for example, U.S. Pat. No. 4,356,429. However, use of such solid solutions carries a substantial risk of phase separation by crystallization of the monomer out of the polymer, especially in environments where the electroluminescent device may be subjected to large changes in temperature. In addition, often it is difficult to find a non-electroluminescent polymer which can both conduct electricity and dissolve a large proportion of the active electroluminescent material to form the necessary solid solution. Finally, the use of a solid solution necessarily involves substantial dilution of the active electroluminescent material and thus lowers the maximum light flux from a given area of the electroluminescent device.

Accordingly, research has been carried out on electroluminescent polymers having an electroluminescent group incorporated into the polymer itself, particularly polymers containing a chain of electroluminescent groups (such as p-phenylene vinylene units) conjugated with one another along the chain; see, for example, International Patent Applications PCT/GB90/00584, PCT/GB91/01420 and PCT/GB91/01421 (Publication Nos. WO 90/13148, WO 92/03490 and WO 92/03491 respectively). These polymers do not suffer from the phase separation, solubility and stability problems encountered with the aforementioned solid solutions, and permit some control over the wavelength of the light emitted by variations in the chemistry of the electroluminescent polymer; for example, the aforementioned International Application PCT/GB91/01420 describes electroluminescent polymers comprising at least two different monomer units having different semiconductor bandgaps to control the conjugation length within the polymer, and hence the quantum efficiency and wavelength of light emitted. However, since in this type of polymer the electroluminescent groups are present in the main chain of the polymer, any desired modification of the physical characteristics of the polymer, or of its electroluminescent properties, often results in an undesirable change in the other. For ease of manufacture of electroluminescent devices, it would often be convenient to have a type of electroluminescent polymer in which substantial variations in the physical characteristics could be made without significant changes in its electroluminescent properties.

One polymer, namely poly(vinylcarbazole), is known having a repeating unit comprising an electroluminescent group directly attached to a non-conjugated main chain fragment; see the papers by R. H. Partridge in Polymer, 24, 733–762 (1983). According to these papers, poly(vinylcarbazole) itself is essentially non-electroluminescent, but the polymer may be rendered electroluminescent by mixing it with either an antimony pentahalide or an electroluminescent monomer, such as perylene or triphenylbutadiene. A very low work function alkali metal electrode is also required Such electroluminescent mixtures are potentially subject to the same type of phase separation and stability problems as the solid solution electroluminescent mixtures discussed above, and the use of the alkali metal electrode raises additional problems.

Accordingly, there remains a need for an electroluminescent polymer which permits variation in the physical characteristics of the polymer without substantial changes in its electroluminescent properties. In addition, the electroluminescent polymer should not require the presence of additives which pose stability or phase separation problems. Finally, it is desirable that the electroluminescent polymer have good electroluminescent efficiency (which is measured as quanta emitted per electron injected); the electroluminescent efficiencies of prior art polymers are typically of the order of 0.1%, so that large amounts of electrical energy are required to produce an electroluminescent image display device which can be viewed in normal room lighting, as is essential if, for example, the image display device is to be used as a computer monitor or television screen.

It has now been found that electroluminescent polymers having desirable properties can be formed by attaching, to a main chain essentially free from electroluminescent groups, a plurality of side chains, each of which comprises an electroluminescent group and a flexible spacer connecting the electroluminescent group to the main chain.

SUMMARY OF THE INVENTION

This invention provides an electroluminescent polymer comprising a main chain essentially free from electroluminescent groups and a plurality of side chains, each of these side chains comprising an electroluminescent group and a flexible spacer connecting the electroluminescent group to the main chain, the spacers and the main chain being such that the electroluminescent groups are not conjugated with one another.

This invention also provides an electroluminescent device comprising a first electrode, a second electrode and a layer of an electroluminescent polymer disposed between, and in electrical contact with, the first and second electrodes, wherein the electroluminescent polymer is a polymer of the present invention.

This invention also provides a process for generating electromagnetic radiation, which process comprises:
 providing first and second electrodes;
 providing a layer of an electroluminescent polymer disposed between, and in electrical contact with, the first and second electrodes; and
 applying a potential difference between the first and second electrodes sufficient to cause current to flow from the first electrode to the second electrode and electromagnetic radiation to be generated in the layer of electroluminescent polymer,
 wherein the electroluminescent polymer is a polymer of the present invention.

This invention also provides a process for the preparation of an electroluminescent polymer of the present invention, which process comprises:
 providing a monomer having an electroluminescent group, a polymerizable group and a flexible spacer connecting the electroluminescent group to the polymerizable group; and
 polymerizing said monomer, thereby connecting the polymerizable groups of a plurality of monomer molecules to form the main chain of the electroluminescent polymer. This process may hereinafter be referred to as the "first synthetic process" of the invention.

This invention also provides a process for the preparation of an electroluminescent polymer of the Invention, which process comprises reacting a polymer having a plurality of first functional groups with a monomer comprising an electroluminescent group, a spacer group and a second functional group capable of reacting with one of the first functional groups on the polymer, thereby causing the second functional groups on a plurality of monomer molecules to react with a plurality of first functional groups on the polymer and form the polymer of the present invention. This process may hereinafter be referred to as the "second synthetic process" of the invention.

This invention also provides a process for the preparation of an electroluminescent polymer of the invention, which process comprises reacting a polymer comprising a main chain bearing a plurality of sidechains, each of said sidechains comprising a flexible spacer connected to the main chain and a first functional group connected to the end of the flexible spacer remote from the main chain, with a monomer comprising an electroluminescent group and a second functional group capable of reacting with one of the first functional groups on the polymer, thereby causing the second functional groups on a plurality of monomer molecules to react with a plurality of first functional groups on the polymer and form the polymer. This process may hereinafter be referred to as the "third synthetic process" of the invention.

Finally, this invention provides a process for the preparation of an electroluminescent polymer of the invention, which process comprises polymerizing a monomer having a ring, a flexible spacer connected to the ring and an electroluminescent group connected to the end of the flexible spacer remote from the ring, said ring comprising at least one atom capable of forming part of a polymer main chain, said polymerization causing opening of said ring and formation of the polymer. This process may hereinafter be referred to the "fourth synthetic process" of the invention.

DETAILED DESCRIPTION OF THE INVENTION

Figure 1:
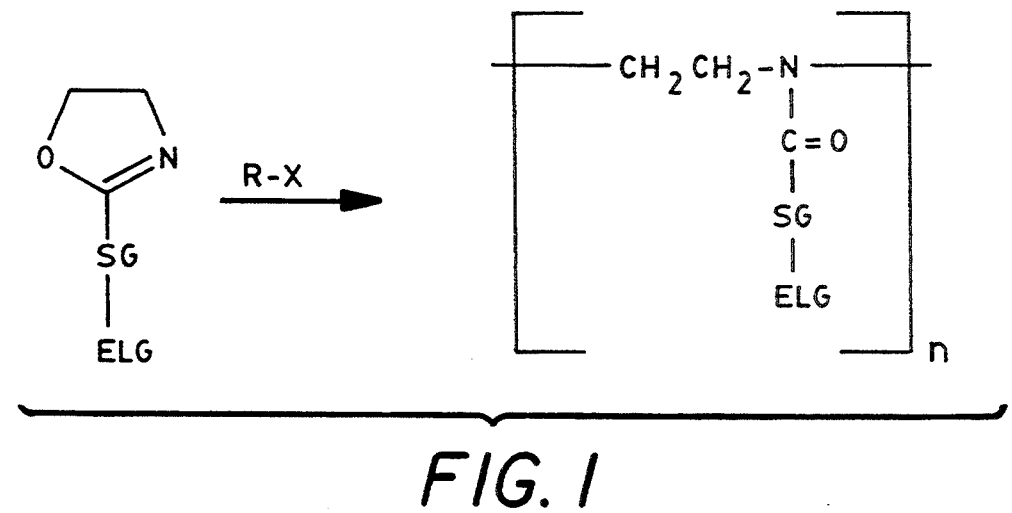
FIGS. 1 and 2 of the accompanying drawing show two examples of the fourth synthetic

As already mentioned, this invention provide: an electroluminescent polymer having a main chain essentially free from electroluminescent groups. Attached to this main chain are a plurality of side chains, each of these side chains comprising an electroluminescent group and a flexible spacer connecting the electroluminescent group to the main chain. The spacers and the main chain are chosen so that the electroluminescent groups are not conjugated with one another.

The present polymers are of the type having single extended main chain bearing a plurality of side chains. The physical and chemical characteristics of this type of polymer (for example, the solubility of the polymer in various solvents, and its film-forming properties) can be varied significantly by varying the type of main chain used, without major changes in the electroluminescent properties of the polymer. In addition, it has been found that the present polymers display substantial electroluminescence without the need for any additives such as antimony compounds or electroluminescent organic monomers, and thus without incurring any of the risks of phase separation and instability which typically accompany the use of such additives.

The main chain of the present polymers is desirably flexible so as to permit the main chain to assume a variety of conformations and to permit free rotation of sections of the main chain relative to one another. Such a flexible main chain allows additional degrees of freedom for the electroluminescent groups to move relative to one another, and, as explained in more detail below, it is believed that one reason for the desirable electroluminescent properties of the present polymers is the ability of the electroluminescent groups to move relative to one another so as to assume the relative conformations most favorable for electroluminescence. Flexible maim chains include polymethylene, poly(alkylmethylene), polyether, poly(alk)acrylate, polyurethane, polyimide, polyamide, polyurea, polyester, polyether ether ketone, poly(N-acylimine) and polysiloxane chains.

The electroluminescent groups of the present polymers may be derived from any of the compounds which are known to be electroluminescent in their monomeric form. Typically, the electroluminescent group will comprise a plurality of aromatic rings, which may be carbocyclic or heterocyclic aromatic rings. The aromatic rings may be fused or may be conjugated with one another via unsaturated chains; for example, the electroluminescent group could be derived from 1,2-diphenylethylene. Specific preferred electroluminescent groups useful in the present polymers include anthracenyl, naphthacenyl, pentacenyl, fluoranthrenyl, tetrahydrochrysenyl (or other rigidified stilbene groups), pyrenyl, carbazolyl, and perylenyl groups, and 1H-benzimidazo[2,1-a]benz[de]isoquinolinyl and 4-(2'-phenyl)-vinylphenyl groupings. Benzoxazole, benzthiazole, benzimidazole and other heterocyclic groups may also be used. It should be noted that certain groups derived from compounds, which are only very weakly electroluminescent, or even apparently non-luminescent, in their monomeric form, give acceptable results in the present polymers; for example, carbazole is apparently not detectably electroluminescent as a monomer, and poly(vinylcarbazole) is, as noted above, only electroluminescent in the presence of additives, but polymers of the present invention containing carbazolyl groups connected to siloxane main chains have been found to display substantial electroluminescence without additives.

The flexible spacers in the present polymers must be such as to allow the electroluminescent groups to rotate freely relative to the main chain, and desirably allow some translation of the electroluminescent groups relative to the main chain. Appropriate spacer groups will readily be apparent to organic chemists, and include, for example, methylene and polymethylene groups, and ester, ether, urea, urethane and amide linkages. The spacer groups may contain a plurality of such groups and linkages depending upon the length of spacer group desired; for example, the spacer group can be of the formula

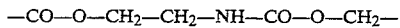

—CO—O—CH$_2$—CH$_2$—NH—CO—O—CH$_2$—

The spacer groups serve to prevent conjugation between the electroluminescent groups on various sidechains of a single polymer molecule. If the main chain of the polymer contains unsaturated groups, the spacer groups also desirably serve to prevent conjugation between the electroluminescent groups of the sidechains and the unsaturated groups of the main chain, thus preventing the main chain unsaturated groups substantially affecting the electroluminescent groups of the polymer.

The spacing of the side chains along the main chain can vary widely. If the polymer is produced by the first synthetic process of the invention, for example by polymerizing a monomer containing an electroluminescent group connected via a flexible spacer to a vinyl or substituted vinyl group, the polymer will carry a side chain on alternate carbon atoms of the main chain. If wider spacing between the side chains is desired, the same monomer could be copolymerized with ethylene or a substituted ethylene, the substituent being such that the side chain it provides does not interfere with the electroluminescence of the polymer. (It will be appreciated that if the comonomer employed is a substituted ethylene or other monomer having a sidechain which does not contain an electroluminescent group and which does not participate in the polymerization reaction, the resultant polymer will contain non-electroluminescent sidechains derived from the comonomer, in addition to the electroluminescent sidechains derived from the electroluminescent monomer.) With other types of main chain, control of the spacing between adjacent side chains may be controlled by choosing the polymerizable group and/or the polymerization reagent employed, as discussed in more detail below.

It has been found experimentally that the spacing between the side chains affects the electroluminescent properties of the polymer; as the spacing between adjacent side chains decreases, or the length of the sidechains decreases, and thus the concentration of electroluminescent groups in the polymer increases, the electroluminescence shifts to longer wavelengths. Thus, the present polymers allow the wavelength of the light emitted to be varied by controlling the spacing between the side chains, or the length of the sidechains, of the polymer.

However, some care should be exercised in increasing the spacing between the electroluminescent sidechains, since it has been found experimentally that if the spacing becomes too great, the electroluminesence from the polymer may be reduced, or even rendered undetectable, due to the low concentration of electroluminescent groups within the polymer. It appears that the spacing at which electroluminescence is reduced depends in part upon the nature of any intervening non-electroluminescent sidechains; apparently, greater spacing between adjacent electroluminescent sidechains can be tolerated if the intervening non-electroluminescent sidechains can function as charge-transfer groups.

The present polymers may contain more than one type of electroluminescent group. Such polymers are readily prepared by copolymerizing two or more monomers containing different electroluminescent groups, with or without a third monomer which does not contain an electroluminescent group but does serve to vary the spacing between the side chains of the polymer, as described above. It has been found experimentally that the electroluminescence from a polymer containing more than one type of electroluminescent group is affected by the nature of the individual electroluminescent groups, the molar ratio of electroluminescent groups and the spacing between adjacent groups. Although the exact nature of the interactions between differing electroluminescent groups is not yet completely understood, it has been found that, provided that the concentration of the electroluminescent groups exceeds a certain threshold, the electroluminescence from a polymer containing multiple electroluminescent groups contains light of a wavelength differing from, and usually longer than, that of the light emitted from any of the electroluminescent groups present alone in a polymer.

The electroluminescent properties of the present polymers may also be affected by the stereoregularity, conformation and morphology of the polymer, and thus the polymerization method used to prepare the polymer may need to be chosen having regard to its effect on the polymer stereoregularity, conformation and morphology.

As already indicated, the polymers of the present invention can be synthesized by conventional techniques, which will be familiar to those skilled in the art of polymer synthesis, and the four preferred processes for synthesis of the polymers have already been summarized above. In the first synthetic process of the invention, a monomer is prepared containing the electroluminescent group, the spacer group and a polymerizable group; obviously, if a polymer containing more than one electroluminescent group is desired, a plurality of such monomers must be prepared. Furthermore, as already mentioned, if desired, this monomer, or mixture of monomers, may be mixed with a monomer containing a polymerizable group but not containing an electroluminescent group, this monomer serving to alter the spacing between adjacent side chains in the final polymer, as well as the physical properties of the final polymer. The monomer or monomer mixture is treated with a catalyst or reagent effective to cause polymerization of the polymerizable group, thus forming the desired polymer. If, for example, the polymer is to have a polymethylene main chain, the polymerizable group(s) on the monomer(s) can be vinyl or other ethylenically unsaturated groups and polymerization can be effected using a free radical initiator, for example azobis(isobutyronitrile) (AIBN). If, on the other hand, a polyester main chain is desired, the polymerizable group(s) may be an $\alpha,\omega$-diol grouping and polymerization may be effected by treating the monomer with an $\alpha,\omega$-dicarboxylic acid. Note that, in this case, the spacing between adjacent side chains in the polymer, and its physical properties, can be adjusted by varying the number of carbon atoms in the diol polymerizable group and/or the dicarboxylic acid comonomer. Variations in this procedure to provide polyamide, polysiloxane and other types of main chain will readily be apparent to those skilled in the art of polymer synthesis.

In the second synthetic process of the invention, a polymer having a plurality of first functional groups is reacted with a monomer comprising an electroluminescent group, a spacer group and a second functional group, so that the second functional groups on a plurality of monomer molecules to react with a plurality of first functional groups on the polymer to form the polymer of the present invention. For example where a polymer having a siloxane main chain is desired, it is convenient to first form a siloxane polymer having first functional groups, in the form of hydrogen atoms bonded directly to silicon atoms, and then to react this siloxane polymer with a monomer comprising the electroluminescent group and flexible spacer desired in the final polymer, but having ethylenic unsaturation at the end of the flexible spacer to be attached to the siloxane chain. Examples of the synthesis of such siloxane polymers are given in Examples 4 and 9. Also, a monomer having an amino group attached to a spacer group and an electroluminescent group can be condensed with a polymer containing pendant reactive groups such as carboxyl, carboxyl halide, azalactone or isocyanate groups.

The third synthetic process of the invention closely resembles the second, except that in the third process the flexible spacers are already present on the monomer, so that the reaction between the first and second functional groups serves to attach the electroluminescent groups from the monomer to the existing flexible spacers on the polymer.

Figure 2:
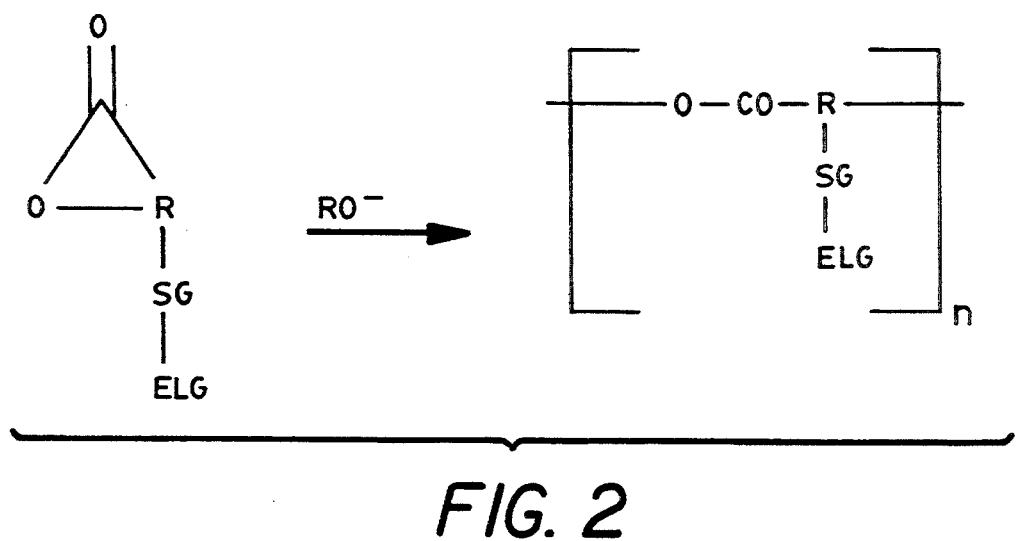

In the fourth synthetic process of the invention, the monomer used comprises a ring, a flexible spacer connected to the ring and an electroluminescent group connected to the end of the flexible spacer remote from the ring, and the ring comprises at least one atom capable of forming part of a polymer main chain. The monomer is polymerized in such a manner that the ring opens, with formation of a polymer of the invention. FIGS. 1 and 2 of the accompanying drawing show two polymerization reactions of this type. The first reaction, shown in FIG. 1, uses a 2-substituted-2-oxazoline in which the 2-substituent comprises a flexible spacer (shown as "SG" in FIG. 1; this spacer group may be, for example, a polymethylene group) and an electroluminescent group ("ELG" in FIG. 1) connected to the end of the flexible spacer remote from the ring. Cationic polymerization with, for example, an alkyl halide, R—X, causes ring-opening to form a polymer having a [—CH$_2$—CH$_2$—N—]$_n$ main chain formed from the nitrogen and 4- and 5-carbon atoms of the ring. The polymer has a plurality of sidechains each comprising an electroluminescent group ELG, a spacer group SG and a carbonyl group derived from the 2-carbon and oxygen atoms of the original ring. In the second reaction, shown in FIG. 2 (in which R represents a carbon atom bearing a single substituent, for example a hydrogen or halogen atom, or an alkyl or alkoxy group), the monomer used is a 2-oxooxirane which bears the flexible spacer and the electroluminescent group at its 3-position. Anionic polymerization using, for example, an alkoxide. RO$^-$, causes ring-opening to form a polymer having an [—O—CO—R—]$_n$ main chain, with each R atom bearing a sidechain comprising the flexible spacer and the electroluminescent group.

Whatever preparative method is employed, care should be taken to ensure that a polymer having a sufficiently high molecular weight is produced, since polymers having too low a molecular weight may give unsatisfactory coatings when used in electroluminescent devices.

Incorporation of the polymers of the present invention into electroluminescent devices can be effected by conventional techniques. Essentially, a thin film (typically having a thickness in the range of about 30 to about 500 nm) is placed between a pair of electrodes, at least one of which is transparent so that light emitted from the polymer by electroluminescence can leave the device. This thin film is typically formed by coating one electrode with a solution of the electroluminescent polymer in an appropriate solvent, the thickness of this layer of solution being controlled by spin coating or other techniques known in the art, and the solution is allowed to dry to form the layer of polymer on the electrode. More than one layer of polymer may be used between the electrodes, if desired. Care must be taken that the polymer layer produced is substantially free from defects which act as non-radiative recombination centers, since such defects tend to quench or prevent the electroluminescence of the polymer layer. Following the formation of the layer of polymer on one electrode, the other electrode may be formed on, or secured to, the opposed side of the polymer layer; typically, the second electrode will be formed by direct deposition of metal vapor onto the polymer layer under high vacuum.

As in prior art electroluminescent devices, in the electroluminescent devices of the present invention it is generally advantageous to incorporate between the polymer layer and the electrodes additional layers to facilitate injection of holes and/or electrons into the polymer layer. Thus, advantageously, the present electroluminescent devices comprise at least one of a non-metallic hole injecting layer interposed between the first electrode (the anode in operation) and the electroluminescent polymer, and a non-metallic electron-injecting layer interposed between the second electrode (the cathode) and the electroluminescent polymer. The hole-injecting layer and electron-injecting layer used in the present electroluminescent devices can be of the same types as those used in prior art electroluminescent devices. Thus, the hole-injecting layer should desirably be formed from a material having a high work function relative to the electroluminescent layer, for example indium/tin oxide, platinum, nickel, palladium or graphite. On the other hand, the electron-injecting layer should desirably be formed from a material having a low work function relative to the electroluminescent layer, for example amorphous or crystalline n-doped silicon, silicon with an oxide coating, or an alkali or alkaline earth metal, either pure or alloyed with another metal, for example silver.

The following Examples are now given, though by way of illustration only, to show details of particularly preferred reagents, conditions and techniques used to produce the electroluminescent polymers of the present invention and electroluminescent devices containing these polymers.

EXAMPLE 1: Preparation of 9-Anthracenemethyl N-(2-methacroylethyl) carbamate

This Example illustrates the preparation of a monomer having an anthracenyl electroluminescent group, a —$CH_2$—O—CO—NH—$CH_2$—$CH_2$—O—CO flexible spacer group and a methylvinyl polymerizable group, this monomer being of the formula:

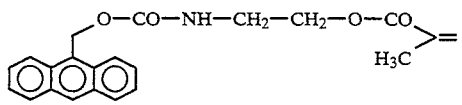

A solution of 9-anthracenemethanol (5.0 g, 24 mmole) in dry THF (50 mL) was added dropwise to a stirred solution of isocyanatoethyl methacrylate (5.0 g, 32 mmole) in dry THF (10 mL) containing dibutyltin dilaurate (0.1 g, 0.16 mmole). The reaction mixture was stirred overnight at room temperature in the dark. When the reaction was complete as indicated by TLC (using a 1:1 v/v hexanes/dichloromethane mixture as eluent) the solvent was removed in vacuo yielding a dark yellow oil. This oil was precipitated into hexanes and filtered, and the resultant solid was washed with hexanes and recrystallized from ethyl acetate/hexanes to give bright yellow needles (8.10 g), melting point 122°–124° C.

On TLC using a 1:1 v/v hexanes/dichloromethane mixture as eluent, the product showed an $R_f$ of 0.44; its proton nuclear magnetic resonance (NMR) spectrum in deuterochloroform was as follows:

δ 1.8 (3H, singlet, =C(CO)—$CH_3$), 3.4 (2H, multiplet, —NH—$CH_2$—$CH_2$), 4.2 (2H, triplet, $CH_2$—$CH_2$—O), 4.9 (1H, triplet (broad) NH), 5.45 (1H, singlet, (CO)C($CH_3$)=CHH cis to $CH_3$), 5.95 (1H, singlet, (CO)C($CH_3$)=CHH trans to $CH_3$), 6.15 (2H, singlet, Ar—$CH_2$—O), 7.44 (4H, multiplet, Ar—H 2, 3, 6 and 7 positions), 7.95 (2H, doublet, Ar—H, 4 and 5 positions), 8.3 (2H, doublet, Ar—H 1 and 8 positions), 8.4 ppm (1H, singlet, Ar—H, 10 position).

Fast atom bombardment mass spectroscopy gave m/e 363 ($M^+$), while the ultraviolet spectrum in dichloromethane was $\lambda_{max}$=332 nm (ε=2,900), 348 nm (5,700), 366 nm (8,400) and 386 nm (7,800).

EXAMPLE 2: Preparation of Poly(9-anthracenemethyl N-(2-methacroylethyl) carbamate)

This Example illustrates the preparation, by free radical polymerization, of a polymer from the monomer prepared in Example 1 above.

A flame-dried, nitrogen-flushed reaction vessel equipped with a magnetic stirrer and a reflux condenser was charged with the monomer (3.80 g) and dry THF (40 mL). The solution was heated with stirring to 55° C. and Vazo 52 initiator (0.03 g, produced by Du Pont de Nemours, Inc., Wilmington Del.) was added to the reaction vessel. The reaction was run for 34 hours and the reaction mixture was then precipitated into hexanes and filtered, and the resultant solid was washed with hexanes. The washed solid was dissolved in dichloromethane and reprecipitated into methanol and filtered, and the resultant solid was washed with methanol and dried to give a bright yellow solid (3.20 g), $T_g$ 133° C., having $M_w$ 34,200; $M_n$ 13,400; $M_w/M_n$=2.5 by Gel Permeation Chromatography (GPC).

The product had an infra-red spectrum on KBr plates of 3400 (m, N—H). 3040 (w, Ar—H), 2980 (m, aliphatic CH), 1720 (vs, urethane C=O) and 1630 (s, aromatic C=C) $cm^{-1}$. Its ultraviolet spectrum in dichloromethane was $\lambda_{max}$=258 nm ($\epsilon_{rel}$=0.347), 350 nm (0.020), 368 nm (0.029) and 388 nm (0.026).

EXAMPLE 3: Preparation of 1-vinylpyrene

A 250 mL round-bottomed flask, equipped with a magnetic stirrer, an argon inlet and a Claisen adapter bearing an addition funnel and an argon outlet leading to a mineral oil bubbler, was dried in an oven, assembled hot and cooled under a stream of argon. The flask was charged with methyltriphenyl phosphonium bromide (8.4788 g, 23.73 mmole), potassium t-butoxide (23.7 mL of a 1.0M solution in tetrahydrofuran) and 18-crown-6 (0.180 g). Dry tetrahydrofuran (70 mL) was transferred to the flask under nitrogen using a cannula and the resultant reaction mixture was cooled to 0° C. using an ice-salt bath. Pyrene-1-carboxaldehyde (5.0 g, 21.7 mmole) was dissolved in dry THF (25 mL) and this solution was transferred to the addition funnel, under a nitrogen atmosphere, using a cannula, and then added dropwise to the cold reaction mixture over a period of 10 minutes. The reaction mixture was allowed to warm to room temperature and stirred overnight under an argon atmosphere. The solid which precipitated was filtered, washed with THF (15 mL) on the frit and the combined filtrate was concentrated on a rotary evaporator to give a solid residue, which was dissolved in dry diethyl ether (50 mL). The ether solution was passed through a short bed of neutral alumina washed with ether and the combined ether filtrate was concentrated to give a yellow solid (6.0 g). This yellow solid was chromatographed on silica gel with hexanes as eluent and the chromatographed material thus obtained was further purified by crystallization from 5% water/ethanol to give an off-white crystalline material (2.1655 g), melting point 88°–89° C. (89° C. according to Kamat, P. V.; Basheer, R.; and Fox, M. A. Macromolecules 18, 1366 (1985)).

The proton NMR spectrum of the product in deuterochloroform was as follows:

δ 5.92 (1H, doublet, J=1.24), 5.98 (1H, doublet, J=1.28), 7.73 (1H, double doublet, J=10.98, 6.35), 7.91–8.32 (multiplet, aromatic H). The $^{13}C$ NMR spectrum in the same solvent was as follows:

δ 134.25, 132.37, 131.49, 130.99, 130.91, 128.12, 127.59, 127.46, 127.30, 125.97, 125.27, 125.06, 125.04, 124.94, 124.90, 123.67, 123.04 and 117.24 ppm.

The product had an infra-red spectrum on KBr plates of 3040, 2971, 1917, 1612, 1598, 1433, 1410, 1311, 1292, 1236, 1183, 1139, 1094, 1029, 988, 965, 906, 843, 756, 726 and 685 cm$^{-1}$. Its ultraviolet spectrum in chloroform was $\lambda_{max}$=286 nm (log $\epsilon$=4.46), 286 nm (4.49) and 360 nm (4.55).

EXAMPLE 4: Preparation of Poly[methyl 2-(1-pyrentyl)ethyl siloxane]

This Example illustrates the preparation, from the alkene prepared in Example 3 above, of a siloxane polymer of the formula:

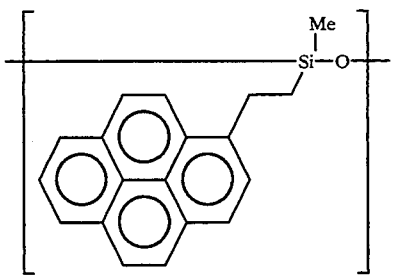

A 25 mL round-bottomed flask, fitted with a magnetic stirrer, an argon gas inlet and a reflux condenser, the top end of which led to a mineral oil bubbler, was charged with poly(methylhydrosiloxane) (0.160 g) (Petrarch PS 122, viscosity 85 cs, produced by Hüls America, Piscataway, N.J.), 1-vinylpyrene (0.6066 g), chloroplatinic acid (2.2 mg) and dry toluene (10 mL). The resultant reaction mixture was stirred and heated at about 75° C., under an argon atmosphere, for one week. Disappearance of vinylpyrene was monitored by TLC on silica gel with hexanes as eluent. After one week, the TLC showed a very faint spot due to vinylpyrene and the infra-red spectrum showed complete absence of Si—H stretch. Five drops of hex-1-ene were added to the reaction mixture, which was then heated at 50°–55° C. for four hours. The reaction mixture was then cooled to room temperature and added dropwise to vigorously stirred hexanes to precipitate the polymer, which was filtered, washed in a Soxhlet apparatus using methanol, and finally dried in a vacuum oven at room temperature for 24 hours. The polymer thus obtained weighed 0.5655 g. Proton NMR indicated complete absence of vinyl and silane protons, and the molecular weight of the polymer as measured by Gel Permeation Chromatography in THF against polystyrene standards, was $M_w$=18376, $M_n$=6220, $M_w/M_n$=3.0. Its ultraviolet spectrum in chloroform was $\lambda_{max}$=268 nm (log $\epsilon$=4.2), 278 nm (4.35), 330 nm (4.25) and 348 nm (4.30).

EXAMPLE 5: Preparation of Poly[methyl 2-(9-anthracenyl)ethyl siloxane]

This polymer, which is similar to that prepared in Example 4 above except that the 1-pyrenyl electroluminescent group is replaced by a 9-anthracenyl group, was prepared in a manner exactly similar to that employed in Example 4 above, except that the 1-vinylpyrene was replaced by an equimolar amount of 9-vinylanthracene. The polymer had $M_w$=24,000, $M_n$=9137, $M_w/M_n$=2.7. Its ultraviolet spectrum in chloroform was $\lambda_{max}$ =260 nm ($\epsilon_{rel}$=0.715), 352 nm (0.044), 370 (0.070) and 390 nm (0.064).

EXAMPLE 6: Preparation of 2-methacroylethyl 4-(1-pyrenyl)butyrate

This Example illustrates the preparation of a monomer of the formula:

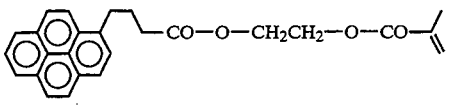

Part A: Preparation of 4-(1-pyrenyl)butyryl chloride 4-(1-Pyrene)butyric acid (2.165 g, 7.5 mmole), oxalyl chloride (4.0 mL), two drops of dimethylformamide and benzene (30 mL) were stirred under argon at room temperature for about 30 minutes. All the solids dissolved to give a clear solution. Benzene and excess oxalyl chloride were removed under reduced pressure and the resultant solid was recrystallized from hexanes to give 1.2930 g of the desired product, the structure of which was confirmed by proton NMR.

Part B: Preparation of 2-methacryloylethyl 4-(1-pyrenyl)butyrate

A solution of 4-(1-pyrenyl)butyrl chloride (6.3265 g, 20.64 mmole, prepared in Part A above) in dichloromethane (10 mL) was added to a solution of hydroxyethyl methacylate (2.9548 g, 22.7 mmole) and pyridine (1.8 mL) in dichloromethane (40 mL). The resultant reaction mixture was stirred at room temperature for 3 days, then dichloromethane was removed under vacuum and the resultant solid residue was suspended in warm water for about 30 minutes. The solid was filtered and dissolved in dichloromethane (200 mL). This dichloromethane solution was washed with water, dried over anhydrous magnesium sulfate and concentrated on a rotatory evaporator to give 7.0 g of crude product, which was chromatographed on neutral alumina, with 50% dichloromethane/hexanes as eluent to give 4.6334 g of pure desired product, melting point 65°–66 ° C.

The proton NMR spectrum of the product m deuterochloroform showed peaks at:

δ 1.92 (3H, singlet), 2.23 (2H, multiplet, J=7.6), 2.49 (2H, triplet, J=7.19), 3.4 (2H, triplet, J=7.5), 4.37 (4H, singlet), 5.55 (1H, multiplet], J=1.56), 6.12 (1H, singlet) and 7.84–8.47 (9H, multiplet, aromatic protons) ppm. The $^{13}$C NMR spectrum in the same solvent showed peaks at:

173.26, 167.15, 135.9, 135.59, 131.42, 130.9, 130.0, 128.75, 127.43, 127.35, 126.75, 126.11, 125.87, 125.11, 124.99, 124.95, 124.81, 123.27, 76.63, 62.48, 62.10. 33.68, 32.70, 26.72 and 18.28ppm.

The product had an infra-red spectrum on KBr plates of 3048, 2950, 2915, 2886, 2835, 1746, 1710, 1632, 1601, 1508, 1487, 1457, 1434, 1417, 1382, 1343, 1320, 1296, 1245, 1181, 1154, 1103, 1083, 1035, 1006, 948, 877, 843, 816, 761 and 710 cm$^{-1}$. Its ultraviolet spectrum in chloroform was $\lambda_{max}$=268 nm (log $\epsilon$=4.35), 278 nm (4.61), 328 nm (4.43) and 344 nm (4.59).

EXAMPLE 7: Preparation of poly[2-methacryloylethyl 4-(1-pyrenyl)butyrate]

This Example illustrates the preparation of a polymer from the monomer prepared in Example 6 above.

A 25 mL round-bottomed flask, equipped with a magnetic stirrer and a reflux condenser attached to an argon gas line, was charged with the monomer (1.5024 g), AIBN (10.2 mg) and freshly dried and distilled methyl ethyl ketone. The flask contents were subjected to three freeze-pump-thaw cycles, the flask being refilled each time with argon, and a diethyl ether/dry ice bath being used to freeze the flask contents. The reaction mixture was then refluxed under an argon atmosphere overnight. The reaction mixture, which had separated into two clear phases, was cooled and the upper phase was decanted. The lower viscous phase was dissolved in tetrahydrofuran (5 mL) and the resultant solution was added dropwise to vigorously stirred methanol to precipitate a colorless polymer. This polymer was filtered, washed overnight in a Soxhlet apparatus using methanol and then dried in vacuo to yield 1.104 g of fluorescent polymer having $T_g$ 67.4° C. (by DSC).

Proton NMR of this polymer, in deuterochloroform, showed complete disappearance of monomer. Its ultraviolet spectrum in chloroform was $\lambda_{max}=268$ nm (log $\epsilon=4.30$), 278 nm (4.51), 330 nm (4.35) and 346 nm (4.47). The molecular weight of the polymer by Gel Permeation Chromatography in THF against polystyrene standards was $M_w=22179$, $M_n=11354$, $M_w/M_n=1.9$.

EXAMPLE 8: Preparation of N-allylcarbazole

This Example illustrates the synthesis of N-allylcarbazole by a method similar to that described in J. Heller, D. J. Lyman, and W. A. Hewett, Makromol. Chem., 73, 48 (1964).

Into a 500-mL, three-necked, round-bottomed flask, equipped with a magnetic stirrer, a thermometer, and a condenser connected to a nitrogen bubbler, were placed carbazole (8.4 g, 50 mmole), allyl bromide (10 mL, 115 mmole), powdered anhydrous potassium carbonate (41 g, 300 mmole), and anhydrous acetonitrile (300 mL). The resultant mixture was stirred and heated under reflux with a heating mantle for 18 hours. Dichloromethane (300 mL) was then added, and the mixture was filtered through a pad of Celite. The clear filtrate was evaporated, and the residue was recrystallized from methanol to yield the desired product as amber-colored crystals. The product had melting point 56°-57° C., and sublimation (100° C./0.1 mm Hg) yielded white crystals (8.65 g, 83%), melting point 57°-58° C. The proton NMR spectrum in carbon tetrachloride was δ 4.70 (2H, multiplet, C$\underline{H}_2$N), 5.0 (2H, multiplet, C=C$\underline{H}_2$), 5.9 (1H, multiplet, NCH$_2$C$\underline{H}$=CH$_2$), 7.2 (6H, multiplet, ring positions 1, 2 and 3), 7.98 (2H, double doublet ring position 4).

Electron impact mass spectrometry gave m/e 207 (M+), and the ultraviolet spectrum in ethanol was:

$\lambda_{max}$ (log $\epsilon$): 235 (4.73), 259 (4.36), 293 (4.31), 326 (3.62), 342 (3.68).

EXAMPLE 9: Preparation of Poly[methyl-3-(N-carbazolyl)propylsiloxane]

This Example illustrates the preparation, from the monomer prepared in Example 8 above, of a siloxane polymer of the formula:

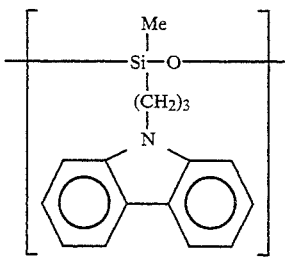

Into a 25 mL, round-bottomed flask equipped with a magnetic stirrer were introduced poly(methyl hydrosiloxane) (Hüls PS 120, 0.29 g, 4.82 mmole of SiH), N-allylcarbazole (1.0 g, 4.82 mmole, prepared in Example 8 above), toluene (10 mL), and chloroplatinic acid (5 drops of a dilute solution in isopropanol, prepared as described in J. L. Speier, J. A. Webster and G. H. Barnes, J. Am. Chem. Soc., 79, 974 (1957)). The resultant solution was stirred under nitrogen at 80° C. for 16 hours, then the amber solution was treated with activated charcoal, filtered through Celite, and added to pentane to precipitate the polymer. After redissolution in dichloromethane, reprecipitation into pentane, and drying under vacuum, the polymer was isolated as an off-white foam (515 mg, 40% yield).

The proton NMR spectrum in deuterochloroform was:

δ −0.5 (3H, multiplet, SiCH$_3$), 0.0 (2H, multiplet, SiC$\underline{H}_2$), 1.4 (2H, multiplet, SiC$\underline{H}_2$C$\underline{H}_2$), 3.7 (2H, multiplet, NC$\underline{H}_2$), 7.2 (6H, multiplet, ring positions 1, 2 and 3) and 7.9 (2H, doublet, ring position 4).

The ultraviolet spectrum in dichloromethane was: $\lambda_{max}$ (log $\epsilon$): 237 nm (4.48), 263 nm (4.22), 295 nm (4.07), 332 nm (3.48) and 347 nm (3.54).

Gel Permeation Chromatography in THF against polystyrene standards gave $M_w=16,820$, $M_n=7,168$, $M_w/M_n=2.35$.

Thermogravimetric analysis showed 2% weight loss in air at 350° C., and at 400° C. in nitrogen, while differential scanning calorimetry showed $T_m$ at 66° C., $T_g$ at 53° C. The refractive index $n_D^{23}=1.633$, as determined with an Abbé refractometer from a sandwich of the polymer melt-pressed at 110° C. between two pieces of high-index glass.

EXAMPLE 10: Preparation of Polysiloxane Polymer with Mixed Sidechains

This Example illustrates the preparation of a polysiloxane polymer similar to that prepared in Example 9 above, but containing two types of sidechains having different electroluminescent groups.

A 50 mL round-bottomed flask was fitted with a magnetic stirrer, an argon gas inlet and a reflux condenser, the top end of which was connected to a mineral oil bubbler. To this flask was added poly(methyl hydrosiloxane) (Petrarch PS 122, viscosity 85 cs, 0.2931 g), vinylpyrene (0.5556 g), N-allylcarbazole (0.5045 g, prepared in Example 8 above), chloroplatinic acid (10.0 mg, dissolved in 2 drops of 2-propanol) and dry toluene (20 mL). The resultant reaction mixture was stirred and heated at about 85° C. under an argon atmosphere for three days, after which time TLC showed only a very faint spot due to vinylpyrene and no spot due to N-allylcarbazole. Fifteen drops of 1-hexene were then added to the reaction mixture, which was heated to 50°-55° C.

overnight, then cooled to room temperature and filtered through a bed of Celite resin. The bed was washed with 50 mL of benzene, which was combined with the original filtrate and the combined filtrates were added dropwise to vigorously stirred hexanes to precipitate the crude polymer. This polymer was separated by filtration, washed with methanol in a Soxhlet apparatus and finally dried in a vacuum oven at room temperature for 24 hours to yield 0.86 g of polymer.

The final polymer obtained had a proton NMR spectrum indicating complete absence of vinyl, allyl and silane protons, a $T_g$ of 67° C. and $M_w$ 30,960, $M_n$ 9394, $M_w/M_n$ 3.30 by GPC. Its ultraviolet spectrum in chloroform was: $\lambda_{max}$ ($\epsilon_{Abs}$)268 nm (1.59), 278 nm (1.53), 332 nm (1.11) and 348 (1.32).

EXAMPLE 11: Preparation of N-[4-(2',5'-dimethoxystilbenyl)] 4(4-methacryloxybutoxy) benzamide This Example illustrates the preparation of a monomer of the formula:

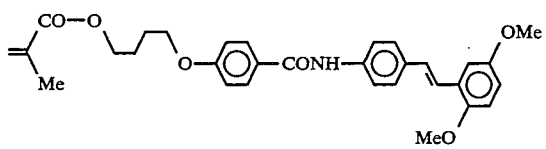

Part A: Preparation of 4-(4-methacryloxybutoxy)-benzoyl chloride 4-(4-Hydroxybutoxy)benzoic acid was first prepared by the method described in Whitcombe et al., Polymer Comm. 32, 380–381 (1991). This acid was then esterified with methacrylic acid by the method described in Portugall et al., Makromol. Chem. 183, 2311 (1982) to give an oil, which was precipitated into water, filtered, dried and recrystallized from 2-propanol to give 4-(4-methacryloxybutoxy)benzoic acid, melting point 103°–106° C. this acid was converted to the desired acid chloride using the method described in the aforementioned Portugall et al. paper; the acid chloride was obtained as a clear, colorless oil, which was recrystallized from dry hexanes to give the final product (84% yield) as fluffy white needles, melting point 30°–31° C.

The proton NMR spectrum of the product in deuterochloroform was:

δ 1.9 (4H, multiplet, Ar—O—CH$_2$CH$_2$CH$_2$CH$_2$—O), 2.0 (3H, singlet, CH$_3$—C=C), 4.15 (2H, triplet, Ar—O—CH$_2$CH$_2$CH$_2$CH$_2$—O), 4.25 (2H, triplet, Ar—O—CH$_2$CH$_2$CH$_2$CH$_2$—O), 5.6 (1H, singlet, CO—C=CH—H trans to CO), 6.1 (1H, singlet, CO—C=CH—H cis to CO), 6.97 (2H, doublet, Ar—H ortho to Ar—O) and 8.1 (2H, doublet, Ar—H ortho to Ar—O). Fast atom bombardment mass spectroscopy gave m/e 297 (M+) and 261 (M+—Cl), while the infrared spectrum (from a film cast on an NaCl disc) showed peaks at 3050 (w, Ar—H), 2980 (s, aliphatic CH), 1775 (vs, acid chloride C=O) and 1620 (m, C=C) cm$^{-1}$.

Part B: Preparation of N-[4-(2',5'-dimethoxystilbenyl)]4-(4-methacryloxybutoxy)benzamide This preparation was carried out by reacting the acid chloride prepared in Part A above with one equivalent of 2',5'-dimethoxy-4-aminostilbene using triethylamine as a catalyst and acid acceptor.

The aminostilbene (0.86 g, 3.36 meq) was dissolved in a mixture of dichloromethane (20 mL) and triethylamine (3 mL) in a dry, argon-flushed 100 mL reaction vessel equipped with a magnetic stirrer. The reaction vessel was cooled by means of an ice/water bath to approximately 0° C. The acid chloride prepared in Part A above was dissolved in dichloromethane (20 mL) and the resultant solution was added dropwise to the stirred aminostilbene solution. The reaction mixture was then allowed to warm to room temperature. Upon completion of the reaction (as indicated by the infra-red and TLC analysis of the reaction mixture), the reaction mixture was extracted successively with water, dilute hydrochloric acid, saturated aqueous sodium carbonate solution and water. The remaining organic layer was then dried over anhydrous magnesium sulfate, and filtered to remove the drying agent, and the filtrate was treated on a rotary evaporator to remove volatile components. The resultant yellow solid was recrystallized from ethyl acetate/hexanes to yield the desired product as fluffy yellow needles, melting point (K$_1$) 103° C., (K$_2$) 132° C.

The proton NMR spectrum of the product in deuterochloroform was:

δ 1.9 (4H, multiplet, Ar—O—CH$_2$CH$_2$CH$_2$CH$_2$—O), 2.0 (3H, singlet, CH$_3$—C=C), 3.8 (6H, two singlets, Ar—CH$_3$, 2' and 5' positions), 4.15 (2H, triplet, Ar—O—CH$_2$CH$_2$CH$_2$CH$_2$—O), 4.25 (2H, triplet, Ar—O—CH$_2$CH$_2$CH$_2$CH$_2$—O), 5.6 (1H, singlet, CO—C=CH—H trans to CO), 6.1 (1H, singlet, CO—C=CH—H cis to CO) and 6.7–7.9 (13H, multiplet, Ar—H). Fast atom bombardment mass spectroscopy gave m/e 516 (M+), while the ultraviolet spectrum in dichloromethane was $\lambda_{max}$=314 nm ($\epsilon$=26,000), 328 nm (26,200) and 350 nm (29,000).

EXAMPLE 12: Production of Poly{N-[4-(2',5'dimethoxystilbenyl)] 4-(4-methacryloxybutoxy)benzamide}

This Example illustrates the preparation of a polymer from the monomer prepared in Example 11 above.

A flame-dried, argon-flushed reaction vessel, equipped with a magnetic stirrer and a reflux condenser, was charged with the monomer (0.76 g, prepared in Example 11 above) and dry THF (10 mL). The solution was heated to reflux, with stirring, under a slow argon purge, and then AIBN (0.01 g) was added and the refluxing was continued for 24 hours. After this time, the resultant solution was cooled to room temperature and precipitated into methanol. The resultant mixture was filtered and the residue purified by dissolution in dichloromethane and reprecipitation with methanol to yield the desired polymer (0.65 g), having $T_g$ 91° C. This polymer had $M_w$ 19,930, $M_n$ 6943, $M_w/M_n$ 2.87 by GPC.

The product had an infra-red spectrum on KBr plates of 3420 (m, NH), 2980 and 2890 (m, m aliphatic CH), 1720 (w, ester C=O) and 1630 (m, amide C=O) cm$^{-1}$. Its ultraviolet spectrum in dichloromethane was $\lambda_{max}$=314 nm ($\epsilon_{rel}$=0.1100), 328 nm (0.1150) and 350 nm (0.1280).

EXAMPLE 13: Preparation of Methacrylate ester of N-(3-fluoranthrenyl)-N'-(2-hydroxyethyl) urea This Example illustrates the production of a polymerizable monomer having a fluoranthrenyl electroluminescent group, an —NH—CO—NHCH$_2$CH$_2$OCO- spacer group and a methylvinyl polymerizable group, this monomer being of the formula:

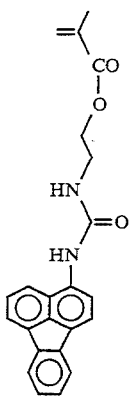

Isocyanatoethyl methacrylate (2.8535 g, 18.4 mmole) and 3-aminofluoranthrene (4.0 g, 18.4 mmole) were stirred together in reagent grade THF (40 mL) at room temperature for 2.5 days. The crystalline solid which precipitated was filtered off, washed successively with THF (30 mL) and hexanes (30 mL), and recrystallized from methanol to give the desired product (1.7776 g), melting point 164°–175.9° C. by differential scanning calorimetry. The product showed a single spot on a TLC plate.

The proton NMR spectrum of the product in deuteroacetone was:

δ 1.93 (3H, singlet), 3.63 (2H, quadruplet, J=5.5, $CH_2$—NH), 4.29 (2H, triplet, J=5.5, $CH_2$—OCO), 5.64 (1$\overline{H}$, singlet, olefinic H), 6.12 (1H, singlet, olefinic H), 6.47 (1H, broad triplet, $CH_2$—NH), 7.36 (2H, multiplet), 7.66 (1H, triplet, J=7.6), 7.9–8.$\overline{09}$ (5H, multiplet), 8.40 (1H, doublet, J=7.8) and 8.51 (1H, broad singlet, NH—Ar). The product had an infra-red spectrum on K$\overline{B}$r plates of 3310, 1720, 1639, 1572, 1492, 1473, 1445, 1346, 1318, 1295, 1255, 1164, 942, 837, 817, 773, 753 and 656 cm$^{-1}$, while the ultraviolet spectrum in THF was $\lambda_{max}$=224 nm (log ε=4.59), 246 nm (4.53), 304 nm (4.41), 326 nm (3.75) and 370 nm (3.95).

EXAMPLE 14: Preparation of Fluoranthreynyl Polymer

This Example illustrates the preparation of a polymer from the monomer of Example 13 above.

The monomer of Example 13 above (1.0 g) and Vaso 52 (11 mg) were dissolved in dimethylformamide. The reaction vessel was purged with argon, stirred and heated under argon at 50°–54° C. for 24 hours. The reaction mixture was then cooled and added dropwise to water to precipitate the polymer. The precipitated polymer was filtered off, washed with methanol in a Soxhlet apparatus for four days and then dried in a vacuum oven overnight, to yield 0.68 g of the final polymer, $T_g$ 200° C. (first scan), 180° C. (second scan). The ultraviolet spectrum of the product in a thin film on quartz was $\lambda_{max}$=210 nm (Abs 0.86), 244 nm (0.70), 294 nm (0.39) and 372 nm (0.22).

EXAMPLE 15: Production of Electroluminescent Devices

This Example illustrates the production of electroluminescent devices from polymers prepared in preceding Examples.

A first coating solution was prepared by dissolving poly(9-anthracenemethyl N-(2-methacroylethyl) carbamate) (0.2 g, prepared in Example 2 above) in 10 mL of either THF or cyclopentanone; after the polymer had dissolved, the solution was filtered through a 0.4 μm filter.

A second coating solution was prepared by dissolving poly{N-[4-(2′,5′dimethoxystilbenyl)] 4-(4-methacryloxybutoxy)benzamide} (0.30 g, prepared in Example 12 above) in a mixture of THF (7 mL) and toluene (3 mL); after the polymer had dissolved, the solution was filtered through a 0.4 μm filter.

The electrodes used in these experiments were of indium tin oxide (ITO) coated glass. The coated glass was washed using a detergent bath in an ultra-sonicator for at least 30 minutes, then thoroughly rinsed with distilled water and dried, either in an oven at 110° C. for 2 hours or in the vapors of refluxing isopropanol for 30 minutes, and stored in a nitrogen-filled glove bag before use. Before coating the polymer solutions onto the glass electrodes, the coated sides of the electrodes were subjected to an argon/oxygen plasma for 10 minutes. The electrodes were removed from the plasma system and immediately spin coated on the ITO-coated side with the desired polymer solution; in all cases, except the polymer of Example 12, which was delivered statically, delivery of the polymer solution was effected dynamically and the film thickness was controlled by varying the spin speed and polymer concentration. The conditions of spin coating and the film thicknesses obtained (using a Tencor Instruments Profilimeter) are shown in the Table below. It was found that film quality was greatly improved by precoating the electrode, after the plasma etch, with a small amount of the solvent used in the polymer solution; this solvent treatment appears to put down a layer of solvent molecules, which change the surface properties of the plasma etched ITO, allowing for improved coating quality.

| Polymer of Example | Spin Speed, rpm. | Coating thickness, nm |
| --- | --- | --- |
| 2 | 500 | 130–140 |
| 2 | 1000 | 54–65 |
| 2 | 1500 | 45–50 |
| 12 | 1000 | 80 |

The polymer of Example 2 showed blue electroluminescence with a slope efficiency (η) of 1.35×10$^{-6}$ (corresponding to an electroluminescent efficiency of approximately 0.02%), while the polymer of Example 12 showed electroluminescence with a slope efficiency (η) of 1.38×10$^{-5}$ (corresponding to an electroluminescent efficiency of approximately 0.2%).

EXAMPLE 16: Production of Electroluminescent Devices

This Example illustrates the production of an electroluminescent device from the polymer prepared in Example 5 above.

ITO-coated glass electrodes were cleaned in the same way as in Example 15 above. A 2% solution of the polymer of Example 5 was prepared by dissolving 0.1 g of the polymer in 5 mL of chloroform and then filtering through a 0.45 μm polytetrafluoroethylene (PTFE) filter. Coated glass electrodes were pretreated by spin evaporating filtered chloroform from their surfaces. After this pretreatment, the polymer solution was spin coated on to the plates in the same way as in Example 15 above. The polymer was coated at 1500 and 1000 rpm for 90 seconds. A second electrode was then formed on each polymer layer by depositing a magnesium-/aluminum layer by metal evaporation.

The polymer showed blue electroluminescence with a slope efficiency ($\eta$) of $3.05 \times 10^{-6}$ (corresponding to an electroluminescent efficiency of about 0.045%).

EXAMPLE 17: Production of Electroluminescent Devices

This Example illustrates the production of an electroluminescent device front the polymer prepared in Example 9 above, An ITO-coated glass electrode was cleaned, pretreated with xylene and spin coated with a 2% solution of the polymer in toluene, and a magnesium/aluminum electrode was deposited on top of the polymer layer, all as described in Example 15 above. The electroluminescence of the device thus produced was measured by applying voltages of from 0 to 30 volts, in 0.5 volt steps. The device showed a violet electroluminescence, $\lambda_{max}=410$ nm, with a turn-on voltage of about 17.2 volts and an electroluminescent efficiency of about 0.4%.

We claim:

1. An electroluminescent polymer comprising a main chain and a plurality of side chains, each of said side chains comprising an electroluminescent group and a flexible spacer connecting the electroluminescent group to the main chain, the spacers and the main chain being such that the electroluminescent groups are not conjugated with one another, the polymer having side chains containing at least two different electroluminescent groups.

2. An electroluminescent polymer comprising a main chain and a plurality of side chains, the main chain comprising a polyether, polyurethane, polyimide, polyamide, polyurea, polyester, polyether ether ketone, poly(N-acylimine) or polysiloxane chain, each of said side chains comprising an electroluminescent group and a flexible spacer connecting the electroluminescent group to the main chain, the spacers and the main chain being such that the electroluminescent groups are not conjugated with one another.

3. An electroluminescent polymer comprising a main chain and a plurality of side chains, each of said side chains comprising an electroluminescent group and a flexible spacer connecting the electroluminescent group to the main chain, the spacers and the main chain being such that the electroluminescent groups are not conjugated with one another, each of the electroluminescent groups comprising a plurality of aromatic rings.

4. An electroluminescent polymer according to claim 3 wherein the electroluminescent group comprises an anthracenyl, naphthacenyl, pentacenyl, fluoranthrenyl, tetrahydrochrysenyl, pyrenyl, carbazolyl, or perylenyl group, or a 1H-benzimidazo[2,1-a]benz[de]isoquinolinyl or 4-(2'-phenyl)-vinylphenyl grouping.

5. An electroluminescent polymer comprising a main chain and a plurality of side chains, each of said side chains comprising an electroluminescent group and a flexible spacer connecting the electroluminescent group to the main chain, the spacers and the main chain being such that the electroluminescent groups are not conjugated with one another, each of the spacer groups comprising a methylene group, a polymethylene group or an ether, urea, urethane or imide linkage.

6. A process for the preparation of an electroluminescent polymer according to claim 1, which process comprises:

providing a first monomer having a first electroluminescent group, a polymerizable group and a flexible spacer connecting the electroluminescent group to the polymerizable group;

providing a second monomer having a second electroluminescent group different from the first electroluminescent group, a polymerizable group and a flexible spacer connecting the electroluminescent group to the polymerizable group:

admixing the first and second monomers; and polymerizing the mixed monomers, thereby connecting the polymerizable groups of a plurality of monomer molecules to form the main chain of the electroluminescent polymer according to claim 1.

7. A process for the preparation of an electroluminescent polymer according to claim 1, which process comprises reacting a polymer having a plurality of first functional groups with a mixture of first and second monomers, the first monomer comprising a first electroluminescent group, a spacer group and a second functional group capable of reacting with one of the first functional groups on the polymer, and the second monomer comprising a second electroluminescent group, a spacer group and a third functional group capable of reacting with one of the first functional groups on the polymer, thereby causing the second and third functional groups on a plurality of monomer molecules to react with a plurality of first functional groups on the polymer and form the polymer according to claim 1.

8. A process according to claim 7 wherein the first polymer comprises a polysiloxane, the first functional groups comprise hydrogen atoms bonded directly to silicon atoms of the polysiloxane, and the second and third functional groups comprise ethylenically unsaturated linkages.

9. A process for the preparation of an electroluminescent polymer according to claim 1, which process comprises reacting a polymer comprising a main chain bearing a plurality of sidechains, each of said sidechains comprising a flexible spacer connected to the main chain and a first functional group connected to the end of the flexible spacer remote from the main chain, with a mixture of first and second monomers, the first monomer comprising a first electroluminescent group and a second functional group capable of reacting with one of the first functional groups on the polymer, and the second monomer comprising a second electroluminescent group and a third functional group capable of reacting with one of the first functional groups on the polymer, thereby causing the second and third functional groups on a plurality of monomer molecules to react with a plurality of first functional groups on the polymer and form the polymer according to claim 1.

10. A process for the preparation of an electroluminescent polymer according to claim 2, which process comprises polymerizing a monomer having a ring, a flexible spacer connected to the ring and an electroluminescent group connected to the end of the flexible spacer remote from the ring, said ring comprising at least one atom capable of forming part of a polymer main chain, said polymerization causing opening of said ring and formation of the polymer according to claim 1.

11. A process according to claim 10 wherein the monomer is a 2-substituted-2-oxazoline in which the 2-substituent comprises the electroluminescent group, and wherein, in the polymer produced, the 2-carbon and oxygen atom from the monomer ring form the spacer group, while the nitrogen atom and remaining two carbon atoms from the monomer ring form the polymer main chain.

12. An electroluminescent polymer comprising a main chain and a plurality of side chains, the main chain comprising a polymethylene, poly(alkylmethylene), polyether, poly(alk)acrylate, polyurethane, polyimide, polyamide, polyurea, polyester, polyether ether ketone, poly(N-acylimine) or polysiloxane chain, each of said side chains comprising an electroluminescent group and a flexible spacer connecting the electroluminescent group to the main chain, the spacers and the main chain being such that the electroluminescent groups are not conjugated with one another, each of the electroluminescent groups comprising a plurality of aromatic rings, and the polymer having side chains containing at least two different electroluminescent groups, and each of the spacer groups comprising a methylene group, a polymethylene group, or an ester, ether, urea, urethane, imide or amide linkage.

* * * * *